US012744015B2

(12) United States Patent
Miura et al.

(10) Patent No.: US 12,744,015 B2
(45) Date of Patent: Sep. 22, 2026

(54) DISPLAY DEVICE

(71) Applicant: SHARP KABUSHIKI KAISHA, Sakai City (JP)

(72) Inventors: Takafumi Miura, Sakai City (JP); Masamitsu Kobayashi, Sakai City (JP); Yasuyuki Togashi, Sakai City (JP)

(73) Assignee: SHARP KABUSHIKI KAISHA, Sakai City (JP)

(*) Notice: Subject to any disclaimer, the term of this patent is extended or adjusted under 35 U.S.C. 154(b) by 0 days.

(21) Appl. No.: 19/254,251

(22) Filed: Jun. 30, 2025

(65) Prior Publication Data

US 2026/0045233 A1 Feb. 12, 2026

(30) Foreign Application Priority Data

Aug. 9, 2024 (JP) ................................ 2024-134411

(51) Int. Cl.

| | |
|---|---|
| ***G09G 3/36*** | (2006.01) |
| ***G09G 3/00*** | (2006.01) |
| ***G09G 3/34*** | (2006.01) |

(52) U.S. Cl.

CPC ........... *G09G 3/3607* (2013.01); *G09G 3/001* (2013.01); *G09G 3/342* (2013.01); *G09G 2320/0209* (2013.01); *G09G 2320/0686* (2013.01)

(58) Field of Classification Search

CPC ............................ G09G 3/3607; G09G 3/342

See application file for complete search history.

(56) References Cited

U.S. PATENT DOCUMENTS

2010/0033473 A1* 2/2010 Hsieh .................. H04N 13/349 345/94
2013/0342590 A1* 12/2013 Lee ...................... H04N 13/302 345/204
2014/0347453 A1 11/2014 Tanaka et al.

FOREIGN PATENT DOCUMENTS

JP 2015038530 A 2/2015
WO WO 2021102619 A1 * 6/2021 ............. G06F 18/00

* cited by examiner

*Primary Examiner* — Scott D Au
(74) *Attorney, Agent, or Firm* — Keating & Bennett, LLP

(57) ABSTRACT

In a first display pattern in which first input data corresponding to a first image is a first highest gray scale and second input data corresponding to a second image is a second lowest gray scale, a control unit sets the second lowest gray scale as display data of the second image, and in a second display pattern in which the first input data is a first lowest gray scale and the second input data is the second lowest gray scale, the control unit sets a gray scale larger than the second lowest gray scale as the display data of the second image.

7 Claims, 23 Drawing Sheets

| VIEWING ANGLE | FIRST SIDE LUMINANCE LumiRR0 (GRAY SCALE 0) | | FIRST SIDE LUMINANCE LumiRR1 (GRAY SCALE 1) | | ... | FIRST SIDE LUMINANCE LumiRR254 (GRAY SCALE 254) | | FIRST SIDE LUMINANCE LumiRR255 (GRAY SCALE 255) | |
|---|---|---|---|---|---|---|---|---|---|
| 30° | SECOND SIDE LUMINANCE | SECOND SIDE DISPLAY GRAY SCALE | SECOND SIDE LUMINANCE | SECOND SIDE DISPLAY GRAY SCALE | ... | SECOND SIDE LUMINANCE | SECOND SIDE DISPLAY GRAY SCALE | SECOND SIDE LUMINANCE | SECOND SIDE DISPLAY GRAY SCALE |
| | L0R0 | 0 | L0R1 | 0 | | L0R254 | 0 | L0R255 | 0 |
| | L1R0 | 1 | L1R1 | 1 | | L1R254 | 1 | L1R255 | 1 |
| | L2R0 | 2 | L2R1 | 2 | | L2R254 | 2 | L2R255 | 2 |
| | ... | ... | ... | ... | | ... | ... | ... | ... |
| | L253R0 | 253 | L253R1 | 253 | | L253R254 | 253 | L253R255 | 253 |
| | L254R0 | 254 | L254R1 | 254 | | L254R254 | 254 | L254R255 | 254 |
| | L255R0 | 255 | L255R1 | 255 | | L255R254 | 255 | L255R255 | 255 |
| ⋮ | FIRST SIDE LUMINANCE LumiRR0′ (GRAY SCALE 0) | | FIRST SIDE LUMINANCE LumiRR1′ (GRAY SCALE 1) | | ... | FIRST SIDE LUMINANCE LumiRR254′ (GRAY SCALE 254) | | FIRST SIDE LUMINANCE LumiRR255′ (GRAY SCALE 255) | |
| 45° | SECOND SIDE LUMINANCE | SECOND SIDE DISPLAY GRAY SCALE | SECOND SIDE LUMINANCE | SECOND SIDE DISPLAY GRAY SCALE | ... | SECOND SIDE LUMINANCE | SECOND SIDE DISPLAY GRAY SCALE | SECOND SIDE LUMINANCE | SECOND SIDE DISPLAY GRAY SCALE |
| | L0R0 | 0 | L0R1 | 0 | | L0R254 | 0 | L0R255 | 0 |
| | L1R0 | 1 | L1R1 | 1 | | L1R254 | 1 | L1R255 | 1 |
| | L2R0 | 2 | L2R1 | 2 | | L2R254 | 2 | L2R255 | 2 |
| | ... | ... | ... | ... | | ... | ... | ... | ... |
| | L253R0 | 253 | L253R1 | 253 | | L253R254 | 253 | L253R255 | 253 |
| | L254R0 | 254 | L254R1 | 254 | | L254R254 | 254 | L254R255 | 254 |
| | L255R0 | 255 | L255R1 | 255 | | L255R254 | 255 | L255R255 | 255 |
| ⋮ | | | | | | | | | |

FIG. 19

IN CASE OF SECOND SIDE INPUT: 224 GRAY SCALE, FIRST SIDE LUMINANCE: LumiRR240'

| VIEWING ANGLE | FIRST SIDE LUMINANCE LumiRR240' (GRAY SCALE 240) | |
|---|---|---|
| | SECOND SIDE LUMINANCE | SECOND SIDE DISPLAY GRAY SCALE |
| 45° | L0R240 | 0 |
| | L1R240 | 1 |
| | ... | ... |
| | LUMINANCE A | 220 |
| | ... | ... |
| | L254R240 | 254 |
| | L255R240 | 255 |

DISPLAY DEVICE

CROSS-REFERENCE TO RELATED APPLICATIONS

This application claims the benefit of priority to Japanese Patent Application Number 2024-134411 filed on Aug. 9, 2024. The entire contents of the above-identified application are hereby incorporated by reference.

BACKGROUND

Technical Field

The disclosure relates to a display device.

JP 2015-38530 A discloses a display device including a display panel for displaying a composite image. The display device disclosed in JP 2015-38530 A aims to suppress occurrence of crosstalk.

SUMMARY

In the display device disclosed in JP 2015-38530 A, caused by display of one of two images constituting a composite image, crosstalk in the other of the two images, which is not constant with respect to a viewing angle of the other of the two images, may occur. In this respect, the display device disclosed in JP 2015-38530 A has room for improvement in display quality.

A display device according to an aspect of the disclosure includes a display unit configured to superimpose and display a first image visually recognized in a first viewing range and a second image visually recognized in a second viewing range, and a control unit configured to control the display unit, in which in a first display pattern in which first input data corresponding to the first image is a first highest gray scale and second input data corresponding to the second image is a second lowest gray scale, the control unit sets the second lowest gray scale as display data of the second image, and in a second display pattern in which the first input data is a first lowest gray scale and the second input data is the second lowest gray scale, the control unit sets a gray scale larger than the second lowest gray scale as the display data of the second image.

According to an aspect of the disclosure, the display device having a high display quality can be achieved.

BRIEF DESCRIPTION OF DRAWINGS

The disclosure will be described with reference to the accompanying drawings, wherein like numbers reference like elements.

FIG. 19 shows an example of a table for converting the second input data into display data of the second image.

DESCRIPTION OF EMBODIMENTS

Figure 1:
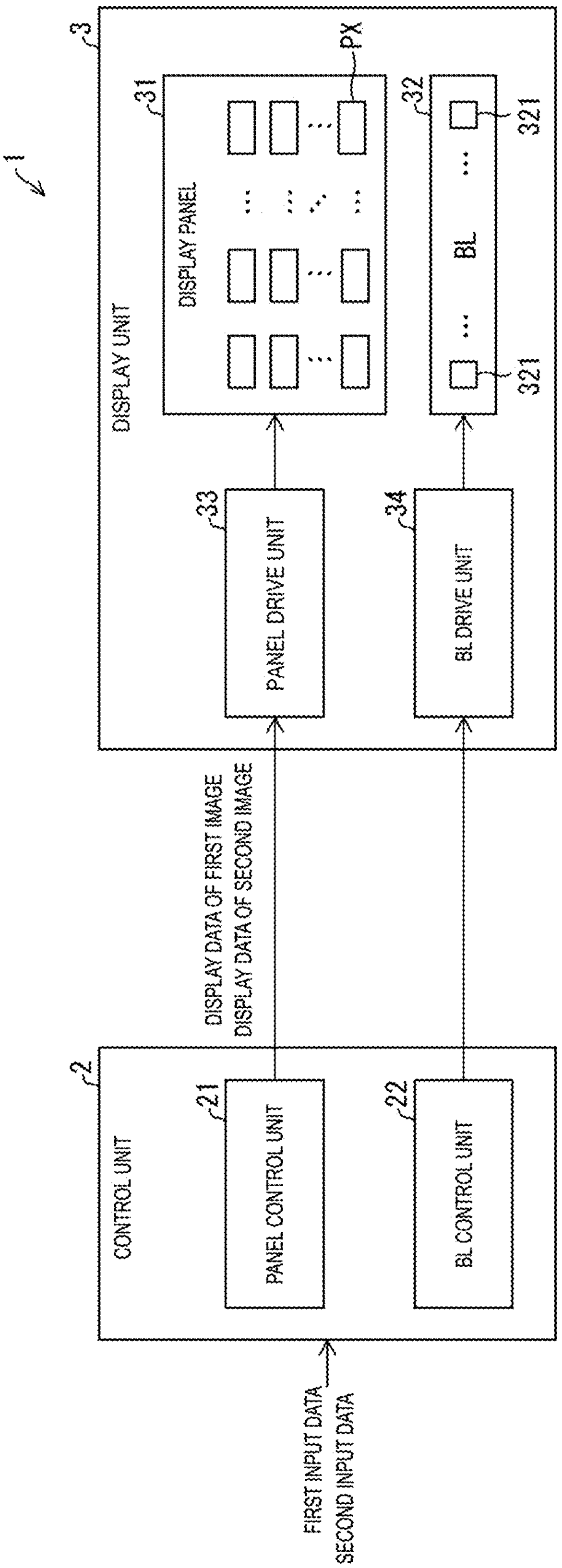
FIG. 1 is a block diagram illustrating a configuration of a display device according to a first embodiment of the disclosure.

Embodiments for implementing the disclosure will be described. For convenience of description, members having the same functions as members described earlier may be denoted by the same reference numerals and signs, and the description thereof will not be repeated.

First Embodiment

FIG. 1 is a block diagram illustrating a configuration of a display device 1 according to a first embodiment of the disclosure. The display device 1 includes a control unit 2 and a display unit 3. The display device 1 may be a portable information terminal or a stationary display device. In the specification, a backlight is abbreviated as "BL". In the specification, a case in which the display device 1 is a liquid crystal display device will be described as an example.

The control unit 2 comprehensively controls each component of the display device 1. The control unit 2 includes a panel control unit 21 and a BL control unit 22. The control unit 2 controls a display panel 31 and a BL 32.

The panel control unit 21 generates display data corresponding to any input data. The display data is data indicating a spatial distribution of light transmittance of a liquid crystal in the display panel 31. The panel control unit 21 supplies the generated display data to a panel drive unit 33.

The BL control unit 22 generates BL data corresponding to the input data. The BL data is data indicating a spatial distribution of luminance in the BL 32. The BL control unit 22 supplies the generated BL data to a BL drive unit 34.

The display unit 3 displays an image in accordance with a command from the control unit 2. The display unit 3 is a liquid crystal display. The display unit 3 includes the display panel 31, the BL 32, the panel drive unit 33, and the BL drive unit 34.

The display panel 31 includes a display region in which a plurality of pixels PX are arrayed. In the specification, a case in which the display panel 31 is a liquid crystal display panel will be described as an example. The display panel 31 displays a predetermined image in accordance with a command from the control unit 2.

In the specification, an XYZ orthogonal coordinate system is used. An X direction and a Y direction correspond to a column direction and a row direction of the display panel 31, respectively. A Z direction is a normal direction of a display surface of the display panel 31. In the specification, it is assumed that auser of the display device 1 is located on a positive side in the Z direction. The positive side in the Z direction is also referred to as a viewer side. A negative side in the Z direction is also referred to as a substrate side. The Z direction in the specification is also a thickness direction of the display device 1.

An XY plane in the specification is a plane parallel to the display surface of the display panel 31. The display panel 31 includes the plurality of pixels PX regularly disposed in each of the X direction and the Y direction.

The BL 32 includes a light source 321 of the display unit 3. The BL 32 may include a plurality of the light sources 321. By controlling light emission of the plurality of light sources 321, the spatial distribution of luminance in the BL 32 can be controlled. The BL 32 emits illumination light toward the display panel 31. In the specification, a case in which the light source 321 is a white LED, in other words, a case in which the illumination light is white light will be described as an example. The LED is an abbreviation for light emitting diode.

The panel drive unit 33 drives the display panel 31 in accordance with the display data obtained from the panel control unit 21. Specifically, the panel drive unit 33 changes the light transmittance of each position of the display panel 31 in accordance with the display data.

The BL drive unit 34 drives the BL 32 in accordance with the BL data obtained from the BL control unit 22. The BL drive unit 34 controls turning on of the BL 32 in accordance with the BL data. The BL drive unit 34 controls the luminance of the plurality of light sources 321 in accordance with the BL data.

The control unit 2 (*i*) drives the display panel 31 through the panel drive unit 33 and (ii) drives the BL 32 through the BL drive unit 34, thereby causing the display panel 31 to display an image.

The display device 1 is a dual-view liquid crystal display device. The display unit 3 superimposes and displays a first image visually recognized in a first viewing range AR1 and a second image visually recognized in a second viewing range AR2. Thus, the display device 1 presents two individual images, the first image and the second image, in accordance with a viewing direction of the user. The control unit 2 controls the display unit 3.

Figure 2:
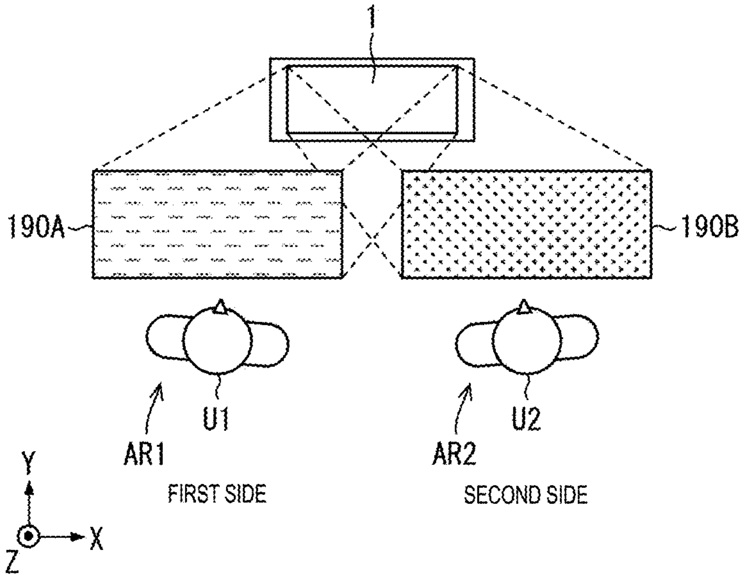
FIG. 2 schematically illustrates dual-view display.

FIG. 2 schematically illustrates dual-view display in the display device 1. FIG. 2 illustrates a first user U1 and a second user U2.

In the example of FIG. 2, a side in a negative direction of the X direction is referred to as a first side, and a side in a positive direction of the X direction is referred to as a second side. The second side is a side opposite to the first side in the X direction.

In the specification, it is assumed that the first user U1 is located within the first viewing range AR1 and the second user U2 is located within the second viewing range AR2.

In the example of FIG. 2, the first user U1 is located on the first side with respect to the display surface, and the second user U2 is located on the second side with respect to the display surface. A first image 190A is presented to the first user U1. A second image 190B is presented to the second user U2.

Figure 3:
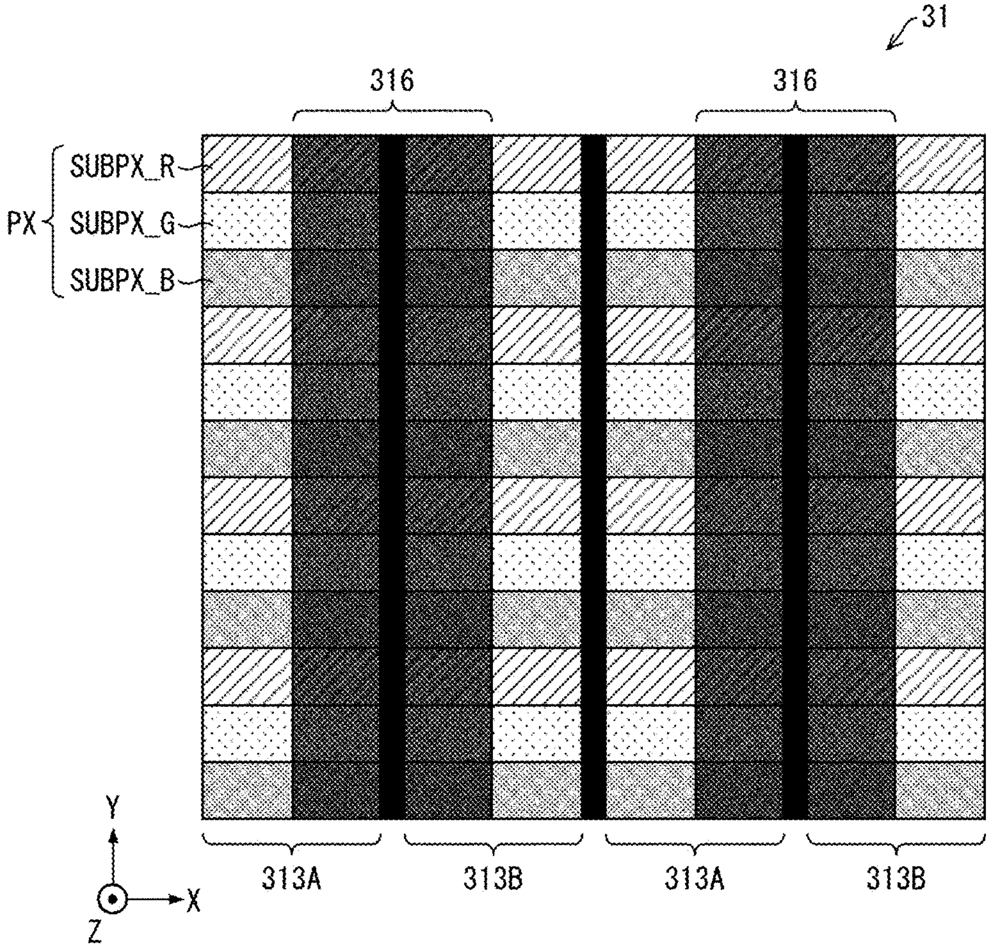
FIG. 3 is a schematic plan view illustrating a dual-view structure.

FIG. 3 is a schematic plan view illustrating a dual-view structure. The dual-view structure is a hardware configuration for achieving a dual-view display device. One pixel PX includes one red subpixel SUBPX_R, one green subpixel SUBPX_G, and one blue subpixel SUBPX_B. The red subpixel SUBPX_R includes a red color filter, the green subpixel SUBPX_G includes a green color filter, and the blue subpixel SUBPX_B includes a blue color filter.

Of the white light emitted from the BL 32, the white light incident on the red subpixel SUBPX_R is converted into red light. Of the white light emitted from the BL 32, the white light incident on the green subpixel SUBPX_G is converted into green light. Of the white light emitted from the BL 32, the white light incident on the blue subpixel SUBPX_B is converted into blue light. In the display panel 31, an image is displayed on the display surface by the red light, the green light, and the blue light each emitted from the pixel PX and traveling toward a viewing side.

The display panel 31 is a pixel group 313 including a first pixel group 313A and a second pixel group 313B and includes the pixel group 313 including the plurality of pixels PX including a liquid crystal. The first pixel group 313A is a group of pixels PX contributing to the display of the first image. The second pixel group 313B is a group of pixels PX contributing to the display of the second image.

The pixels PX located in the odd-numbered columns belong to the first pixel group 313A, and the pixels PX located in the even-numbered columns belong to the second pixel group 313B.

In the display panel 31, the first pixel groups 313A and the second pixel groups 313B are alternately located along the X direction. For example, when viewed along the X direction, the first pixel groups 313A and the second pixel groups 313B can be alternately located in the display panel 31.

The display panel 31 includes a plurality of separation member 316. The separation member 316 may contain any light absorbing material. The separation member 316 overlaps part of the first pixel group 313A and overlaps part of the second pixel group 313B when viewed from the display surface. The separation member 316 is located on the viewer side as compared with the first pixel group 313A and the second pixel group 313B.

In the specification, light obtained by wavelength conversion of illumination light emitted from the BL 32 by the first pixel group 313A is referred to as first light, and light obtained by wavelength conversion of illumination light emitted from the BL 32 by the second pixel group 313B is referred to as second light. The separation member 316 prevents part of the first light from traveling toward the display surface of the display panel 31. The separation member 316 also prevents part of the second light from traveling toward the display surface.

Figure 4:
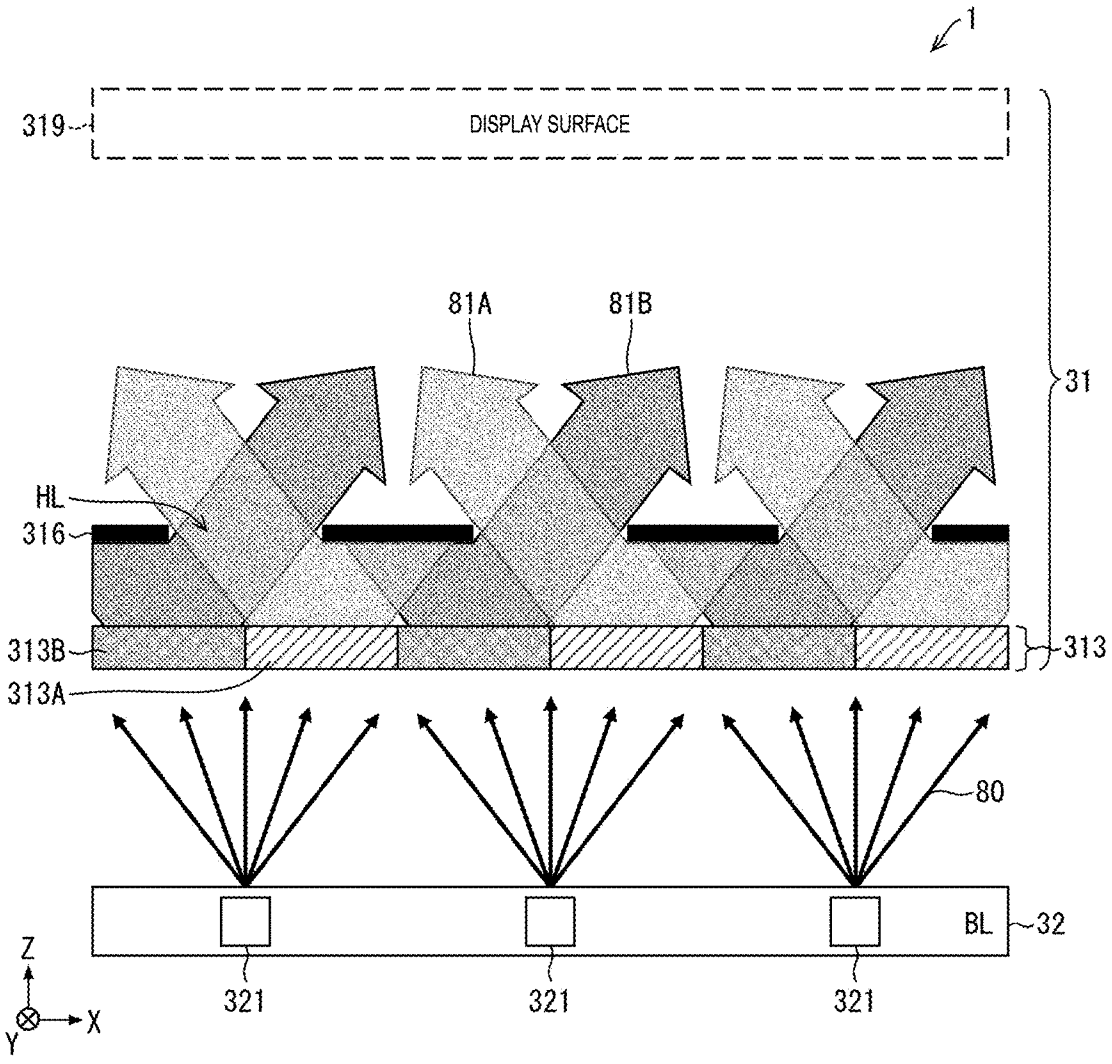
FIG. 4 is a view for explaining various pieces of light involved in the dual-view in an ideal operation example of the display device illustrated in FIG. 1.

FIG. 4 is a view for explaining various pieces of light involved in the dual-view in an ideal operation example of the display device 1. The display panel 31 is located on the viewer side as compared with the BL 32. FIG. 4 illustrates the first pixel group 313A, the second pixel group 313B, the separation member 316, and the display surface 319 as components of the display panel 31.

The BL drive unit 34 drives the BL 32 in accordance with a command from the BL control unit 22. The illumination light 80 is emitted from the BL 32 toward the first pixel group 313A and the second pixel group 313B. In the example illustrated in FIG. 4, it is assumed that the BL 32 does not have any particular light directivity.

The panel drive unit 33 drives the display panel 31 in accordance with a command from the panel control unit 21. The panel drive unit 33 drives each of the first pixel group 313A and the second pixel group 313B in accordance with a command from the panel control unit 21. The panel control unit 21 drives each of the first pixel group 313A and the second pixel group 313B through the control of the panel drive unit 33 so that the first image and the second image are displayed on the display panel 31.

In an ideal operation example, it is assumed that a light absorption rate of the separation member 316 is 100%. Two of adjacent ones of the plurality of separation members 316 form a gap HL through which part of the first light and part of the second light pass. The gap HL is located so as to expose part of each of the first pixel group 313A and the second pixel group 313B when viewed from the display surface.

Part of the first light having directivity toward the first side passes through the gap HL and travels toward the display surface 319. Light 81A is an example of the first light that passes through the gap HL toward the display surface 319 and has directivity toward the first viewing range AR1. The light 81A has, for example, directivity toward the first side. The light 81A contributes to formation of the first image on the display surface 319.

Part of the second light having directivity toward the second side passes through the gap HL and travels toward the display surface 319. Light 81B is an example of the second light that passes through the gap HL toward the display surface 319 and has directivity toward the second viewing range AR2. The light 81B has, for example, directivity toward the second side. The light 81B contributes to formation of the second image on the display surface 319.

Figure 5:
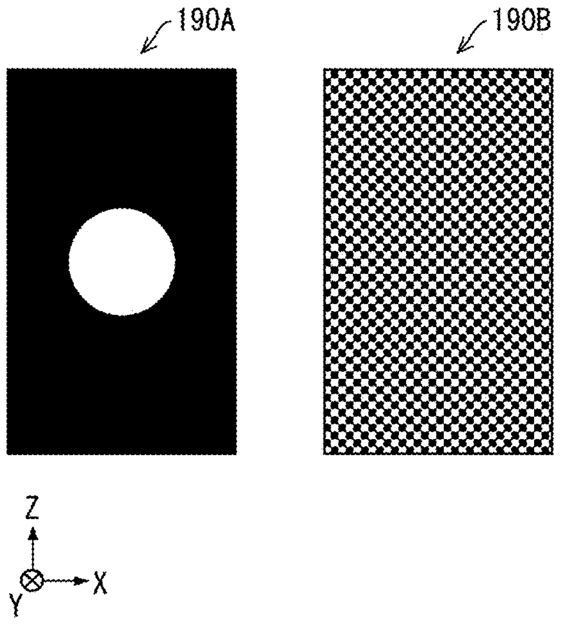
FIG. 5 illustrates examples of a first image and a second image displayed in the ideal operation example of the display device illustrated in FIG. 1.

FIG. 5 illustrates examples of a first image and a second image displayed in the ideal operation example of the display device 1. FIG. 5 corresponds to the example of FIG. 4. The first image 190A is an image indicating a black background and a white circle located at a center portion. The second image 190B is an image indicating a black and white checker pattern.

In the ideal example, crosstalk between the first image 190A and the second image 190B does not occur. The crosstalk in the specification refers to a phenomenon in which one display image is mixed with another display image in multi-view display such as the dual-view display.

Figure 6:
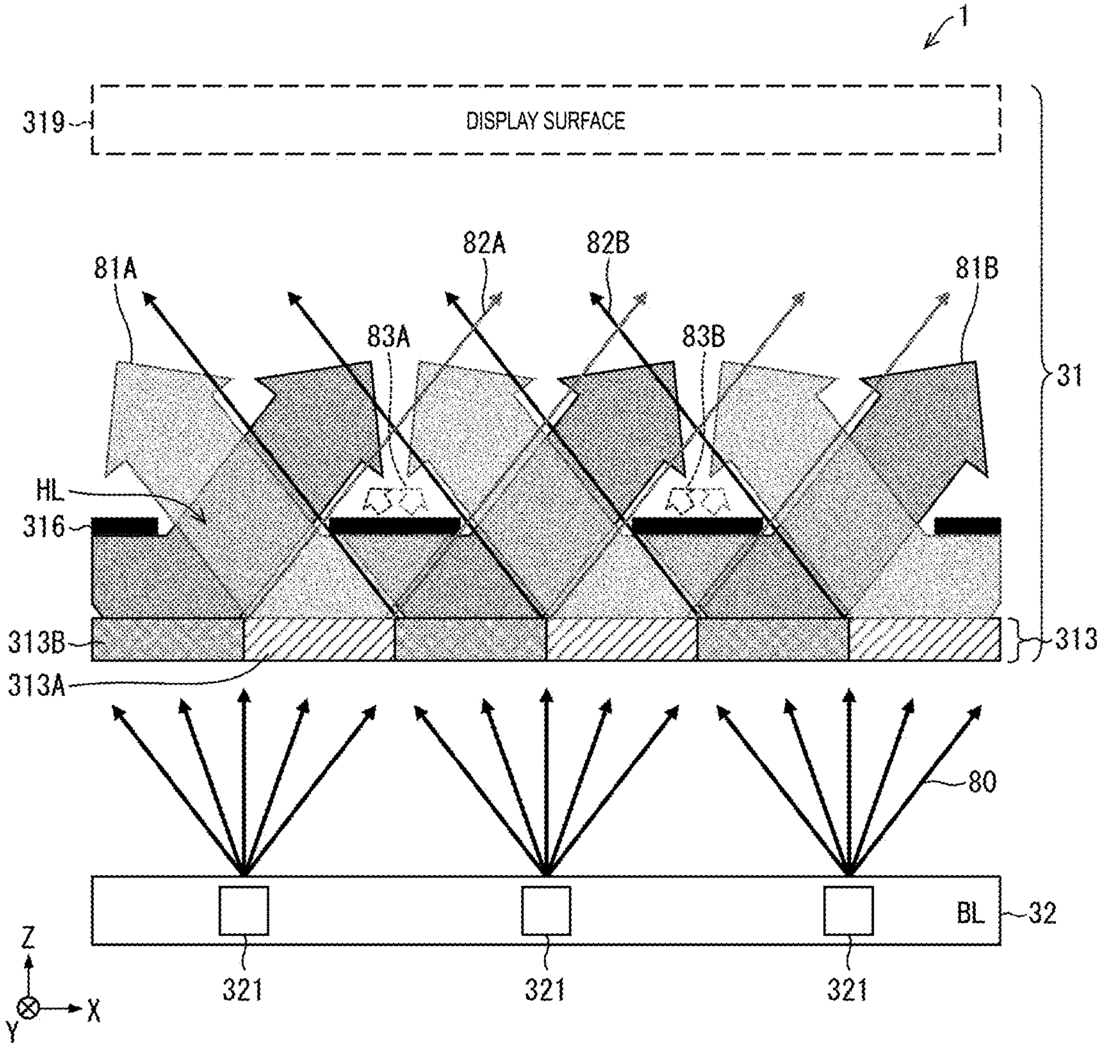
FIG. 6 is a view for explaining various pieces of light involved in the dual-view in an actual operation example of the display device illustrated in FIG. 1.

FIG. 6 is a view for explaining various pieces of light involved in the dual-view in an actual operation example of the display device 1. In the actual operation example, unlike the ideal operation example, the light having the directivity toward the second side in the first light is not completely blocked by the separation member 316. For example, in the actual operation example, part of the first light passes through the gap HL and travels toward the display surface 319. Light 82A is an example of the first light that passes through the gap HL toward the display surface 319 and has directivity toward the second viewing range AR2.

In the actual operation example, the light having the directivity toward the first side in the second light is not completely blocked by the separation member 316. For example, in the actual operation example, part of the second light passes through the gap HL and travels toward the display surface 319. Light 82B is an example of the second light that passes through the gap HL toward the display surface 319 and has directivity toward the first viewing range AR1.

The actual absorption rate of the light separation member 316 is lower than 100%. In the actual operation example, part of the first light is transmitted through a portion of the separation member 316 overlapping the first pixel group 313A and the second pixel group 313B and travels toward the display surface 319. In the actual operation example, part of the second light is transmitted through the portion and travels toward the display surface 319. Light 83A is an example of the first light that passes through the portion toward the display surface 319 and has directivity toward the second viewing range AR2. Light 83B is an example of the second light that passes through the portion toward the display surface 319 and has directivity toward the first viewing range AR1.

Figure 7:
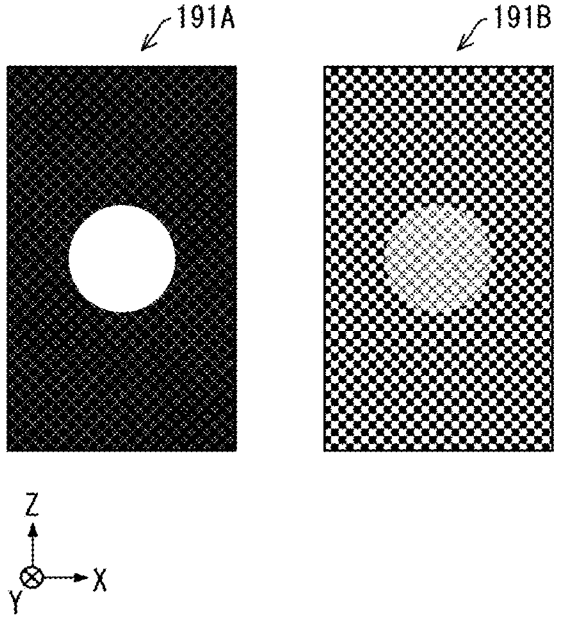
FIG. 7 illustrates examples of the first image and the second image displayed in the actual operation example of the display device illustrated in FIG. 1.

FIG. 7 illustrates examples of the first image and the second image displayed in the actual operation example of the display device 1. In the actual operation example, part of the first light goes around the second viewing range AR2. Thus, the second image 191B is an image in which the first image 190A is mixed with the second image 190B. The mixing of the first image 190A with the second image 190B is caused by the light 82A and the light 83A. The light 82A and the light 83A are undesired first light in the dual-view display.

In the actual operation example, part of the second light goes around the first viewing range AR1. Thus, the first image 191A is an image in which the second image 190B is mixed with the first image 190A. The mixing of the second image 190B with the first image 190A is caused by the light 82B and the light 83B. The light 82B and the light 83B are undesired second light in the dual-view display.

Figure 8:
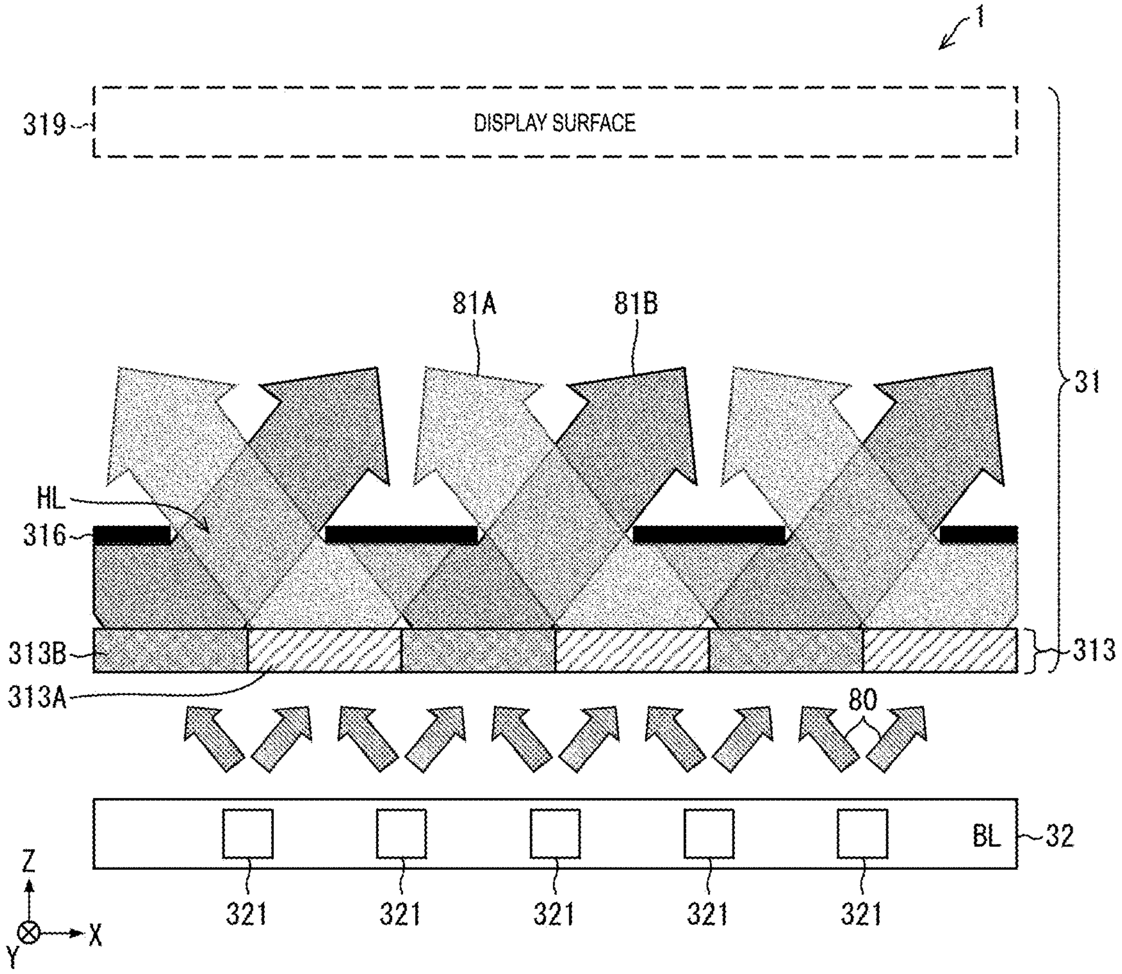
FIG. 8 is a view for explaining various pieces of light involved in the dual-view in the operation example of the display device illustrated in FIG. 1, which is different from FIG. 4.

FIG. 8 is a view for explaining various pieces of light involved in the dual-view in the operation example of the display device 1, which is different from FIG. 4. In the example illustrated in FIG. 8, a direction in which a light emission intensity of the light source 321 is largest is a direction passing through the gap HL between the two of adjacent ones of the plurality of separation members 316. Hereinafter, a configuration in which the direction in which the light emission intensity of the light source 321 is largest is the direction passing through the gap HL between the two of adjacent ones of the plurality of separation members 316 is also referred to as a configuration a. Examples of the light source 321 that can achieve the configuration a include a light source including a prism-shaped light guide, a light source including a viewing angle control film, and a light source including a louver. The plurality of light sources 321 can be turned on separately on the first side and on the second side.

Figure 9:
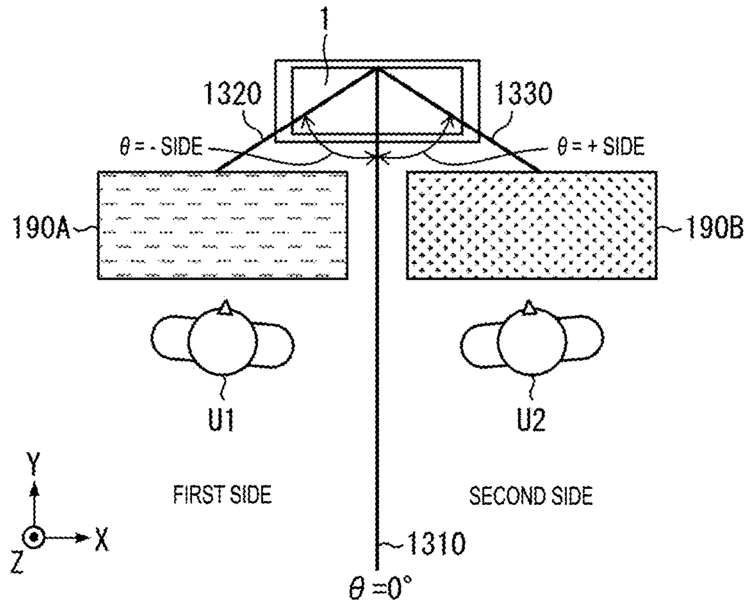
FIG. 9 is a view for explaining an angle θ.

FIG. 9 is a view for explaining an angle θ. The θ represents an inclination angle in the X direction with respect to a Y-axis. The θ is a parameter corresponding to a line of sight direction of a certain user when the user visually recognizes the display surface. In the specification, when an optical axis of interest is parallel to the Y-axis, θ=0°. When the optical axis of interest is an optical axis 1310, θ=0°.

The following can be said for FIG. 9. When a direction of the optical axis of interest coincides with the negative direction of the X direction, θ=−90°. When the optical axis of interest is an optical axis 1320, θ<0°. The first user U1 is located on a side where θ is negative. The side where θ is negative is expressed as "θ=−side". "θ=−side" corresponds to the first side.

The following can be said for FIG. 9. When the direction of the optical axis of interest coincides with the positive direction of the X direction, θ=90°. When the optical axis of interest is an optical axis 1330, θ>0°. The second user U2 is located on a side where θ is positive. The side where θ is positive is expressed as "θ=+side". The "θ=+side" corresponds to the second side.

Figure 10:
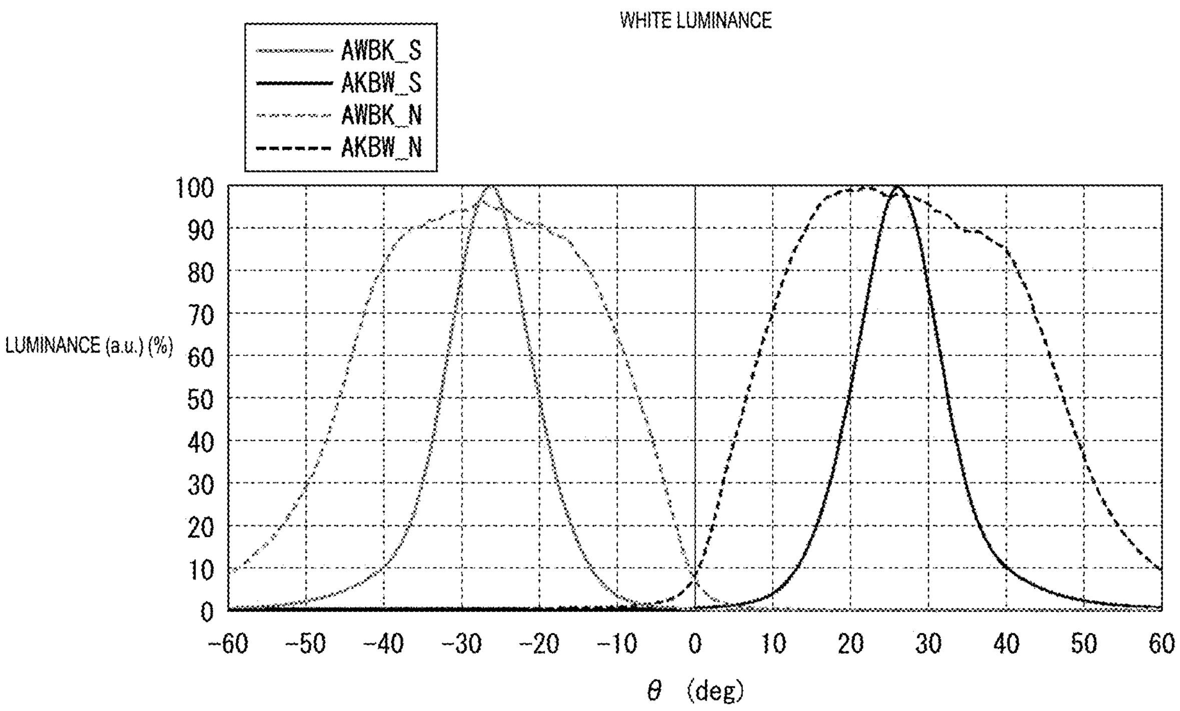
FIG. 10 is a graph showing an example of white luminance according to the display device illustrated in FIG. 1.
Figure 11:
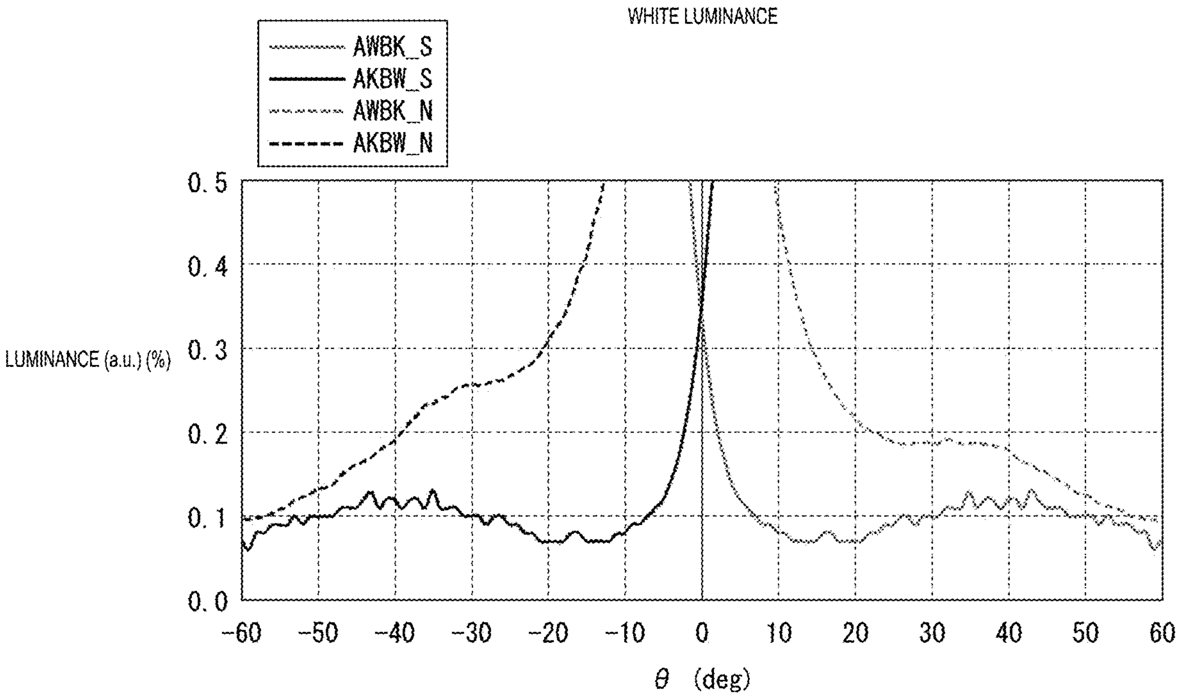
FIG. 11 is another graph showing an example of white luminance according to the display device illustrated in FIG. 1.
Figure 12:
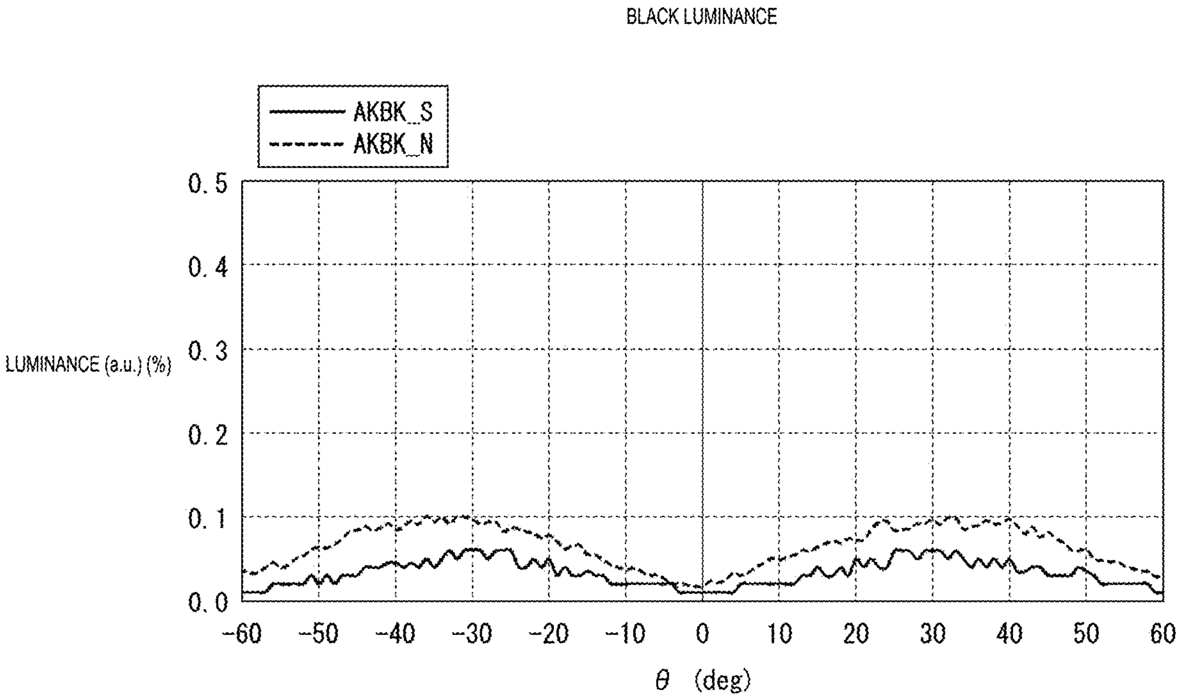
FIG. 12 is a graph showing an example of black luminance according to the display device illustrated in FIG. 1.
Figure 13:
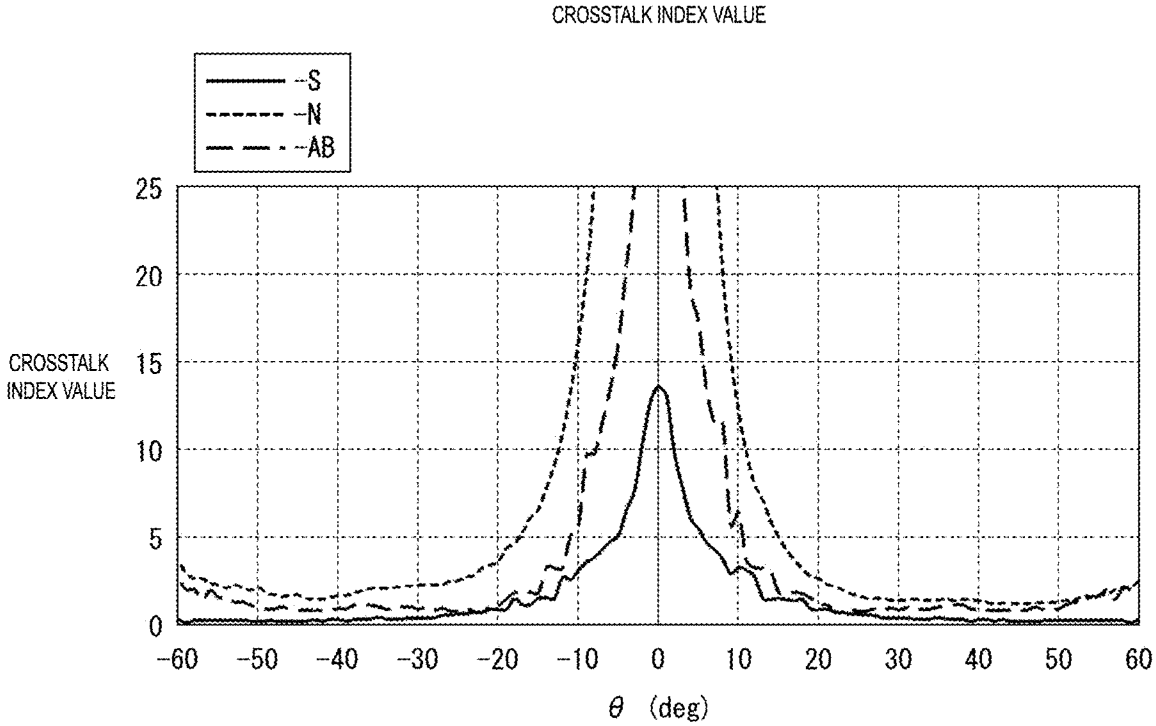
FIG. 13 is a graph showing examples of a crosstalk index value in the display device illustrated in FIG. 1.

FIG. 10 is a graph showing an example of white luminance according to the display device 1. The white luminance is luminance of a display diagram of a white display image. FIG. 11 is another graph showing an example of the white luminance according to the display device 1. FIG. 12 is a graph showing an example of black luminance according to the display device 1. The black luminance is luminance of a display diagram of a black display image. FIG. 13 is a graph showing examples of a crosstalk index value in the display device 1.

For example, when the first side is set to white display and the second side is set to black display, an index indicating how much the luminance of the black display on the second side is increased by being affected by the light leakage on the first side is defined as crosstalk. Here, the crosstalk may be denoted by XT.

The crosstalk is defined as follows.

(AKBW−AKBK)/AKBK    The first side:

(AWBK−AKBK)/AKBK    The second side:

W means the white display, and K means the black display. AWBK means a case in which the first side is the white display and the second side is the black display. AKBW means a case in which the first side is the black display and the second side is the white display. AKBK means a case in which the first side is the black display and the second side is the black display. AWBW means a case in which the first side is the white display and the second side is the white display.

-A, -B, -AB, and -S are cases to which the configuration a is applied. -A means turning on of the light sources 321 corresponding to the first side (irradiating the first pixel group 313A with light). -B means turning on of the light sources 321 corresponding to the second side (irradiating the second pixel group 313B with light). -AB means a case in which both the light source 321 corresponding to the first side and the light source 321 corresponding to the second side are always turned on. -S means a case in which turning on of the light source 321 corresponding to the first side and turning on of the light source 321 corresponding to the second side are switched at high speed. -N means a case in which the configuration a is not applied.

In the following discussion, the crosstalk is discussed using combinations of AWBK, AKBW, AKBK, and AWBW with -A, -B, -AB, -S, and -N. In order to avoid confusion with mathematical symbols, the combinations are expressed enclosed in double quotation marks. For example, in a case of AWBK and -A, the case is expressed as "AWBK-A".

For -S, it is assumed that the following holds by switching the turning on.

"AWBK-S"=("AWBK-A"+"AKBK-B")/2

"AKBW-S"=("AKBW-B"+"AKBK-A")/2

"AKBK-S"=("AKBK-A"+"AKBK-B")/2

"AWBW-S"=("AWBW-A"+"AWBW-B")/2

According to FIG. 12, it can be confirmed that floating of the black luminance is reduced and the crosstalk is reduced by applying the configuration a.

The crosstalk in the display device 1 to which -S is applied is as follows.

("AKBW-S"−"AKBK-S")/"AKBK-S"    The first side:

("AWBK-S"−"AKBK-S")/"AKBK-S"    The second side:

By applying -S, floating on the black side is reduced in "AKBW-S" and "AWBK-S", and reduction of the crosstalk can be confirmed.

By applying the configuration a, crosstalk at a specific viewing angle can be suppressed, but crosstalk at other viewing angles may not be sufficiently suppressed. As the light source 321 becomes a light source with high directivity, a difference in luminance according to the display device 1 depending on the viewing angle becomes more noticeable. In the display device 1, even when the configuration a is applied, there is still room to improve the display quality.

Referring back to FIGS. 1 and 2, the display device 1 includes the control unit 2 and the display unit 3. The display unit 3 superimposes and displays the first image visually recognized in the first viewing range AR1 and the second image visually recognized in the second viewing range AR2. The control unit 2 controls the display unit 3.

In a first display pattern in which a first input data corresponding to the first image is a first highest gray scale and a second input data corresponding to the second image is a second lowest gray scale, the control unit 2 sets the second lowest gray scale as the display data of the second image. In a second display pattern in which the first input data is a first lowest gray scale and the second input data is the second lowest gray scale, the control unit 2 sets a gray scale larger than the second lowest gray scale as the display data of the second image.

In the first display pattern, luminance depending on a plurality of viewing angles of the second viewing range AR2 may be constant. In the second display pattern, luminance depending on the plurality of viewing angles of the second viewing range AR2 may be constant. Thus, regarding the second image, a difference in luminance according to the display device 1 depending on the viewing angle can be reduced.

When the first input data is the first highest gray scale and the second input data is a second highest gray scale, the control unit 2 may set a gray scale smaller than the second highest gray scale as the display data of the second image. When the first input data is the first lowest gray scale and the second input data is the second highest gray scale, the control unit 2 may set the second highest gray scale as the display data of the second image.

Figure 14:
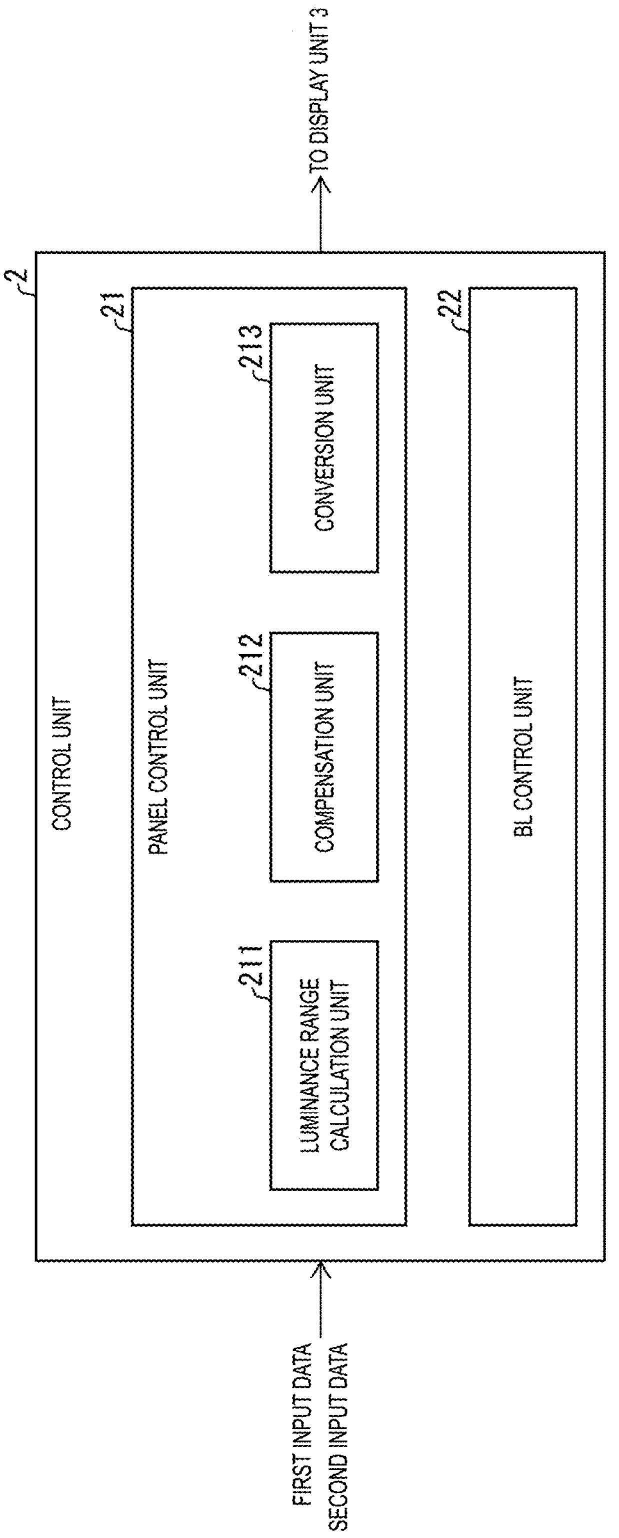
FIG. 14 is a block diagram illustrating a configuration example of a control unit.

FIG. 14 is a block diagram illustrating a configuration example of the control unit 2. The panel control unit 21 of the control unit 2 may include a luminance range calculation unit 211, a compensation unit 212, and a conversion unit 213.

Figure 15:
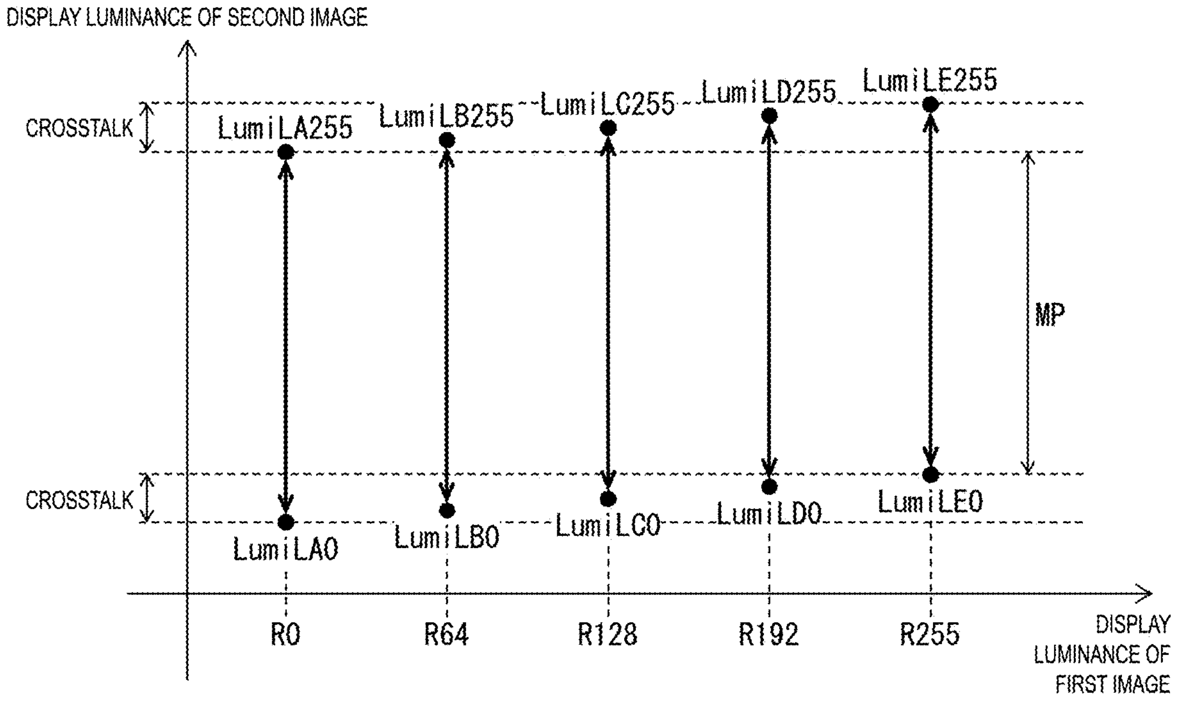
FIG. 15 is a graph showing an achievable range of display luminance of the second image regardless of display luminance of the first image when the first image is displayed.

FIG. 15 is a graph showing an achievable range of display luminance of the second image regardless of display luminance of the first image when the first image is displayed. The panel control unit 21 of the control unit 2 processes the first input data input to the control unit 2 to generate display data of the first image, and supplies the display data of the first image to the panel drive unit 33 of the display unit 3. The panel control unit 21 of the control unit 2 processes the second input data input to the control unit 2 to generate display data of the second image, and supplies the display data of the second image to the panel drive unit 33 of the display unit 3.

It is assumed that the display luminance of the first image corresponds to the gray scale of the first input data. The gray scale of the first input data ranges from 0 gray scales corresponding to a minimum luminance to 255 gray scales corresponding to a maximum luminance. In FIG. 15, B is any integer from 0 to 255, and the luminance corresponding to the B gray scale of the first input data is expressed as RB.

The display luminance of the second image is affected by crosstalk to be described later, but it is assumed that the display luminance basically corresponds to the gray scale of the second input data. The gray scale of the second input data ranges from 0 gray scales corresponding to a minimum luminance to 255 gray scales corresponding to a maximum luminance. In FIG. 15, γ is any integer from 0 to 255, and the γ gray scale of the second input data is expressed as LumiL[any one of A to E]γ. [Any one of A to E] will be described below.

According to FIG. 15, it has been found that an achievable range of the display luminance of the second image changes according to the display luminance of the first image when the first image is displayed.

For 0 gray scales of the first input data, the achievable range of the display luminance of the second image according to the display luminance of the first image when the first image is displayed is from LumiLA0 corresponding to the minimum luminance to LumiLA255 corresponding to the maximum luminance. For 64 gray scales of the first input data, the achievable range of the display luminance of the second image according to the display luminance of the first image when the first image is displayed is from LumiLB0 corresponding to the minimum luminance to LumiLB255 corresponding to the maximum luminance. For 128 gray scales of the first input data, the achievable range of the display luminance of the second image according to the display luminance of the first image when the first image is displayed is from LumiLC0 corresponding to the minimum luminance to LumiLC255 corresponding to the maximum luminance.

For 192 gray scales of the first input data, the achievable range of the display luminance of the second image according to the display luminance of the first image when the first image is displayed is from LumiLD0 corresponding to the minimum luminance to LumiLD255 corresponding to the maximum luminance. For 255 gray scales of the first input data, the achievable range of the display luminance of the second image according to the display luminance of the first image when the first image is displayed is from LumiLE0 corresponding to the minimum luminance to LumiLE255 corresponding to the maximum luminance.

A case is considered in which in both the first display pattern and the second display pattern, the control unit 2 sets 0 gray scales (second lowest gray scale) of the second input data as the display data of the second image. The first display pattern is a pattern in which the first input data is 255 gray scales (first highest gray scale) and the second input data is 0 gray scales. The display luminance of the second image in the first display pattern is LumiLE0. The second display pattern is a pattern in which the first input data is 0 gray scales (first lowest gray scale) and the second input data is 0 gray scales. The display luminance of the second image in the second display pattern is LumiLA0. A phenomenon occurs in which although the second input data is 0 gray scales and is common, the display luminance of the second image is different between the first display pattern and the second displaypattern. The crosstalk contains a first component corresponding to this phenomenon. Since a difference between LumiLE0 and LumiLA0 corresponds to the first component, the following relationship holds for the first component.

$$(AWBK-AKBK)/AKBK=(LumiLE0-LumiLA0)/LumiLA0$$

A case is considered in which the control unit 2 sets 255 gray scales (second highest gray scale) of the second input data as the display data of the second image in both a third display pattern and a fourth display pattern. The third display pattern is a pattern in which the first input data is 255 gray scales and the second input data is 255 gray scales. The display luminance of the second image in the third display pattern is LumiLE255. The fourth display pattern is a pattern in which the first input data is 0 gray scales and the second input data is 255 gray scales. The display luminance of the second image in the fourth display pattern is LumiLA255. A phenomenon occurs in which although the second input data is 255 gray scales and is common, the display luminance of the second image is different between the third display pattern and the fourth display pattern. The crosstalk contains a second component corresponding to this phenomenon.

When the display luminance of the second image is limited to LumiLA0, which has a maximum luminance among LumiLA0 to LumiLE0, or more, the second image can be displayed without being affected by the first component. When the display luminance of the second image is limited to LumiLA255, which has a minimum luminance among LumiLA255 to LumiLE255, or less, the second image can be displayed without being affected by the second component.

In other words, the achievable range of the display luminance of the second image regardless of the display luminance of the first image when the first image is displayed is a luminance range MP from LumiLE0 to LumiLA255. The luminance range calculation unit 211 obtains the luminance range MP.

Figure 16:
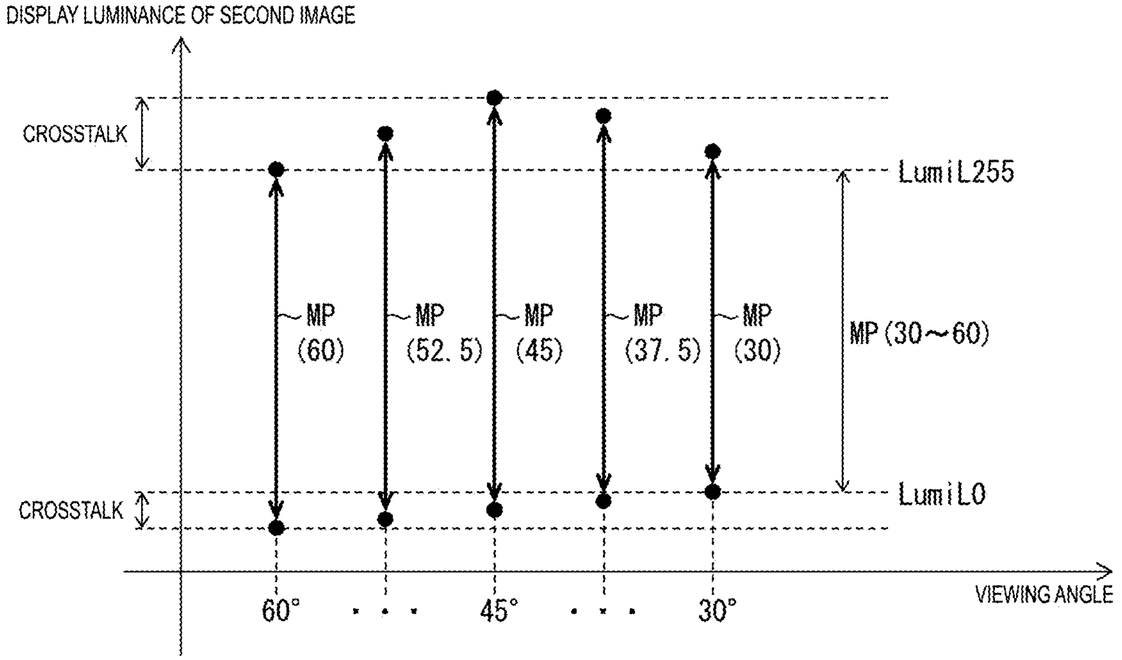
FIG. 16 is a graph showing luminance ranges MP with respect to viewing angles.

FIG. 16 is a graph showing luminance ranges MP with respect to viewing angles. The viewing angle when the first image is viewed is θ (negative value), and the viewing angle when the second image is viewed is θ (positive value).

It can be seen from FIG. 16 that the luminance range MP varies depending on the viewing angle. In FIG. 16, the luminance range MP is indicated for a total of five points of a viewing angle of 30°, a viewing angle of 37.5°, a viewing angle of 45°, a viewing angle of 52.5°, and a viewing angle of 60° within a range of viewing angles from 30° to 60°. In FIG. 16, the luminance range MP at a viewing angle δ° is expressed as MP(δ).

According to FIG. 16, a minimum value of the luminance range MP is LumiL0 which is the smallest in MP(60) and the largest in MP(30). The crosstalk contains a third component corresponding to a difference between LumiL0 and the minimum value in MP(60).

According to FIG. 16, a maximum value of the luminance range MP is LumiL255 which is the largest in MP(45) and the smallest in MP(60). The crosstalk contains a fourth component corresponding to a difference between LumiL255 and the maximum value of MP(45).

When the display luminance of the second image is limited to LumiL0, which has the largest minimum value of the luminance range MP in the range of the viewing angles from 30° to 60°, or more, the second image can be displayed without being affected by the third component. When the display luminance of the second image is limited to LumiL255, which has the smallest maximum value of the luminance range MP in the range of the viewing angles from 30° to 60°, or less, the second image can be displayed without being affected by the fourth component.

In other words, the achievable range of the display luminance of the second image regardless of the display luminance of the first image is the luminance range MP(30 to 60) from LumiL0 to LumiL255 at any viewing angle within the range of the viewing angles from 30° to 60° when the first image is displayed. The luminance range calculation unit 211 obtains the luminance range MP(30 to 60).

Figure 17:
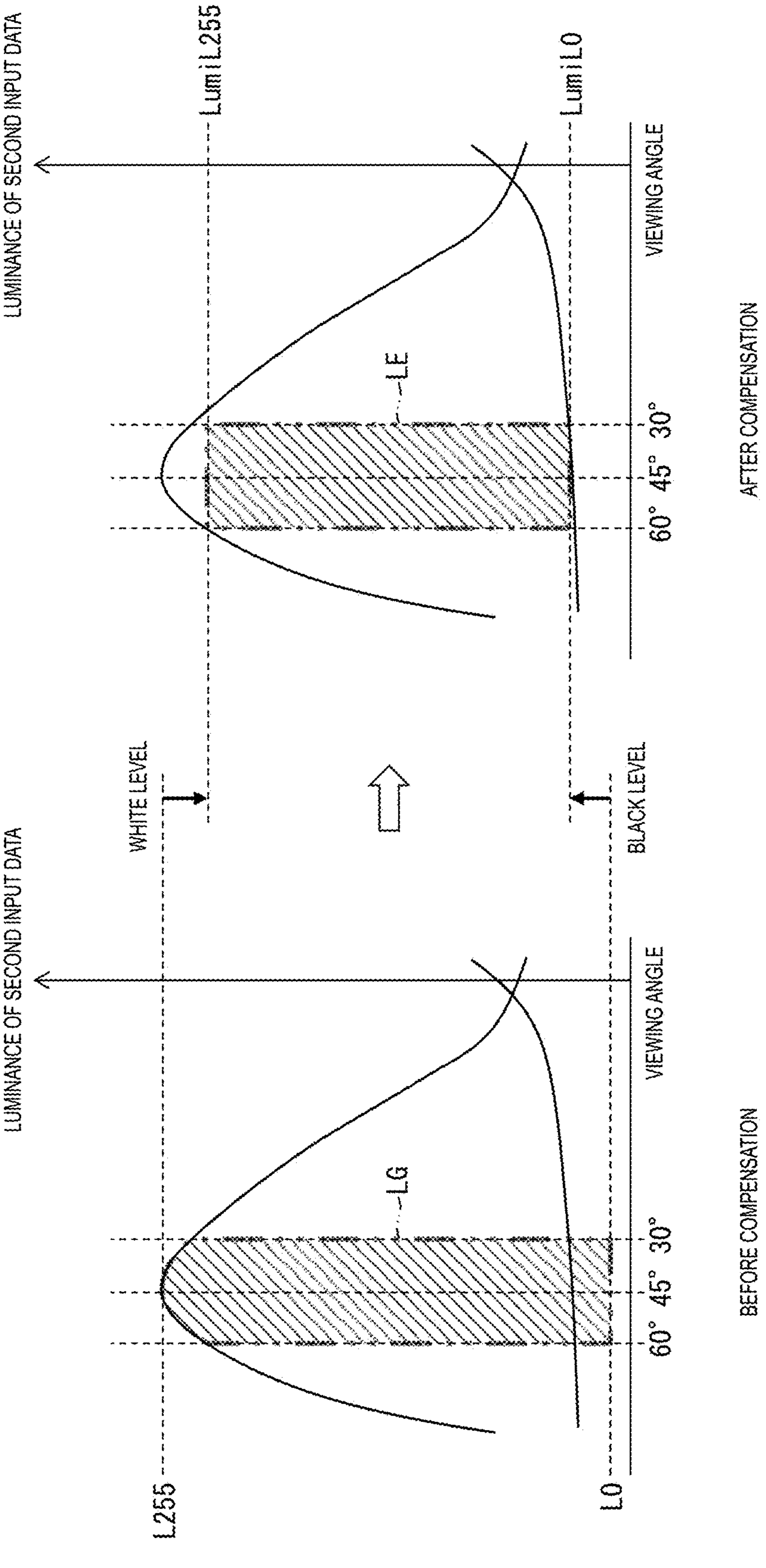
FIG. 17 is a diagram for explaining compensation of second input data based on the luminance range MP (30 to 60).

FIG. 17 is a diagram for explaining compensation of the second input data based on the luminance range MP(30 to 60). The compensation unit 212 compensates the second input data based on the luminance range MP(30 to 60) in the manner shown in FIG. 17 and the description thereof.

In FIG. 17, the luminance corresponding to the β gray scale of the second input data before compensation based on the luminance range MP(30 to 60) is expressed as Lβ. In the second input data after compensation based on the luminance range MP(30 to 60), the minimum luminance is LumiL0 larger than L0, and the maximum luminance is LumiL255 smaller than L255. A region that can exist as a combination of the viewing angle and the luminance of the second input data is compressed from a region LG to a region LE by the compensation. In the second input data after compensation, gray scales 0 to 255 may be assigned again in the luminance range from LumiL0 to LumiL255.

Figure 18:
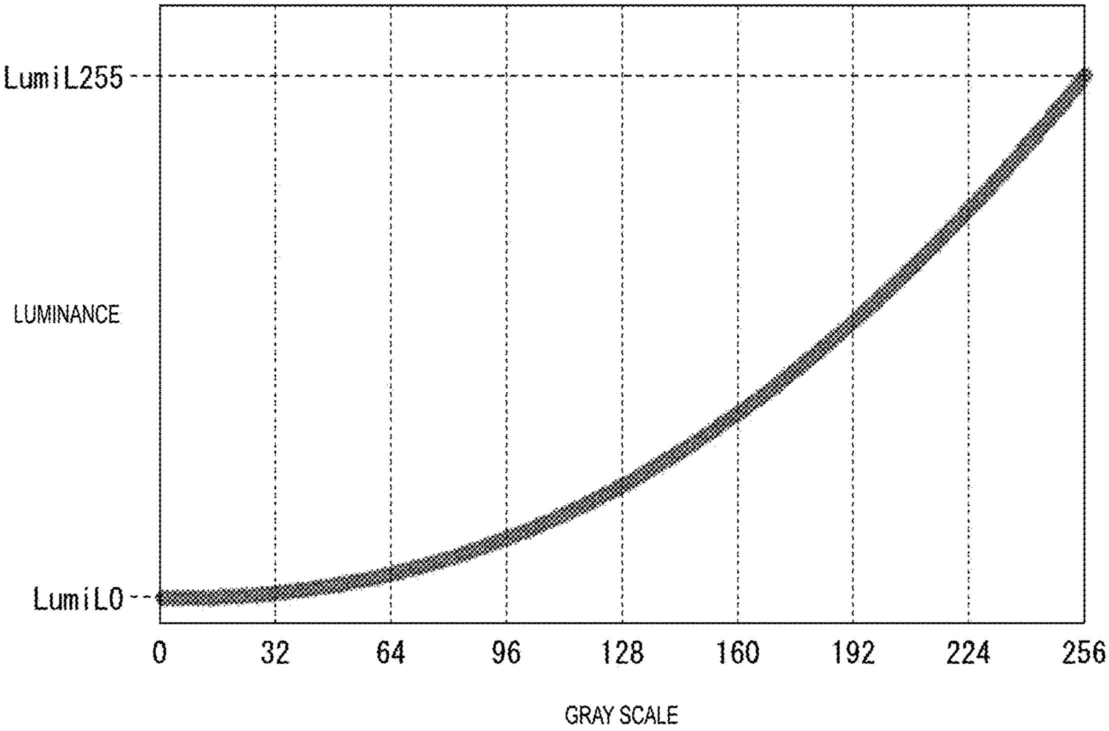
FIG. 18 is a graph showing an example of a relationship of luminance with respect to gray scales in the second input data after compensation.

FIG. 18 is a graph showing an example of a relationship of luminance with respect to gray scales in the second input data after compensation. When compensating the second input data, the compensation unit 212 sets the luminance corresponding to 0 gray scales of the second input data as LumiL0, sets the luminance corresponding to 255 gray scales of the second input data as LumiL255, and applies gamma 2.2 or the like to expand the second input data. The luminance corresponding to gray levels of the second input data is preferably determined based on the gamma 2.2 or the like, but may be determined based on a gamma curve other than the gamma 2.2 or the like.

Next, the conversion unit 213 creates a table for converting the second input data into the display data of the second image. The conversion unit 213 obtains how the display luminance of the second image changes with respect to a change in the gray scale of the second input data in accordance with the display luminance of the first image at each of a plurality of points within the range of the viewing angles from 30° to 60°. FIG. 19 shows an example of the table.

Figure 20:
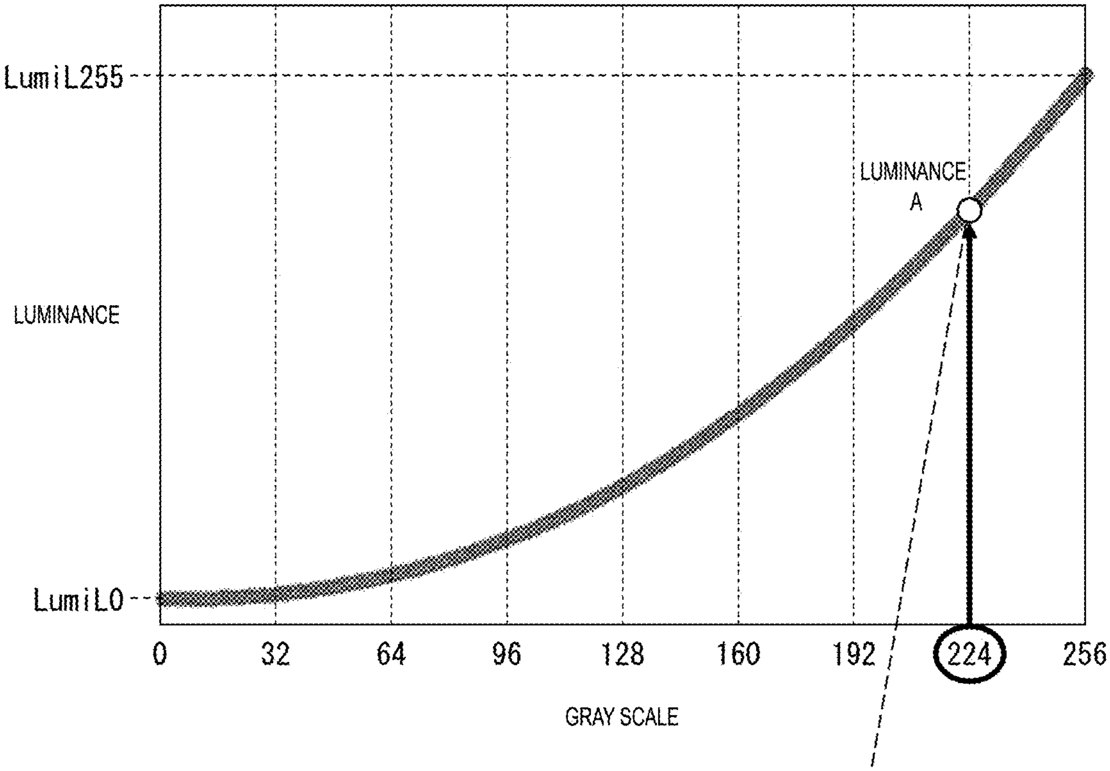
FIG. 20 is a diagram for explaining a method of generating display data of the second image in a case in which the viewing angle is 45°, the second input data is 224 gray scales, and the display luminance of the first image is LumiRR240'.

A case in which the viewing angle is 45°, the second input data is 224 gray scales, and the display luminance of the first image is LumiRR240' is explained with reference to FIG. 20. The conversion unit 213 obtains luminance that is a goal when actually displayed. The conversion unit 213 determines to which luminance of the luminance table interpolated by the gamma curve or the like a target gray scale value of the input image corresponds. In the example shown in FIG. 20, the luminance corresponding to 224 gray scales of the second input data after compensation is luminance A.

Next, when the viewing angle is 45° and the display luminance of the first image is LumiRR240', the conversion unit 213 obtains, from a target table, the number of gray scales to be displayed in order to achieve the display luminance A of the second image. In this example, the luminance A is achieved when 220 gray scales are displayed.

In a case in which a stripe structure is employed, since the pixels PX belonging to the first pixel group 313A are located on both sides of any one of the second pixel groups 313B, the display luminance of the first image may be obtained as a mean value of the luminance corresponding to each of the two of adjacent ones of the pixels PX, or may be obtained using a value in the X direction or the Y direction. Even in a case in which the stripe structure is not employed, the value of the pixel PX belonging to the first pixel group 313A close to the pixel PX belonging to the second pixel group 313B may be used. The conversion from the gray scale value to the luminance value is performed using the gamma curve after compression corresponding to the first input data.

In order to convert the first input data into the luminance value, data obtained by measuring the luminance value of the first image when the first image is displayed as it is without using the gamma curve after compression may be used, or the gray scale value may be converted into the luminance value using the gamma 2.2 or the like.

The panel control unit 21 of the control unit 2 operates in the manner shown in FIGS. 15 to 20 and the description thereof. Thus, the display luminance of the second image can fall within the achievable luminance range regardless of the display luminance of the first image at any viewing angle within the range of the viewing angles from 30° to 60°. Thus, for the second image, the crosstalk caused by the display of the first image and/or the viewing angle of the second image can be reduced, and thus the display device 1 having high display quality can be achieved.

When the second input data is the second highest gray scale and the first input data is the first lowest gray scale, the control unit 2 may set the first lowest gray scale as the display data of the first image. In the second display pattern, the control unit 2 may set a gray scale larger than the first lowest gray scale as the display data of the first image. Thus, effects similar to the second image can also be obtained for the first image.

When the second input data is the second highest gray scale and the first input data is the first highest gray scale, the control unit 2 may set a gray scale smaller than the first highest gray scale as the display data of the first image. When the second input data is the second lowest gray scale and the first input data is the first highest gray scale, the control unit 2 may set the first highest gray scale as the display data of the first image. Thus, effects similar to the second image can also be obtained for the first image.

In this way, the display luminance of the second image is made uniform and the crosstalk is reduced. By compensating the first image in the same manner, effects can be obtained for both types of display.

When the control unit 2 operates in the manner as described above, the display device 1 may have the following configuration caused by at least one of the compensation on the first input data and the compensation on the second input data. The control unit 2 makes characteristics of luminance with respect to a gray scale in the first input data different from characteristic of luminance with respect to a gray scale in the second input data.

The display unit 3 includes the pixel group 313 including the plurality of pixels PX that display the first image and the second image and include a liquid crystal, the light source 321 that irradiates the pixel group 313 with light from a back face of the pixel group 313, and the plurality of separation members 316 that separate the first image and the second image from each other. The direction in which the light emission intensity of the light source 321 is largest may be the direction passing through the gap HL between the two of adjacent ones of the plurality of separation members 316. This implies that the display device 1 may have the configuration ay.

With regard to fineness of FIGS. 15, 16, 19, and the like, for example, the table according to FIG. 19 may be a table for each gray scale or may be a table interpolated based on a table with a several gray scale pitch. In addition, also in terms of an angle (viewing angle), the pitch may be made finer, or interpolation may be performed between the angles in increments of about 5°.

Figure 21:
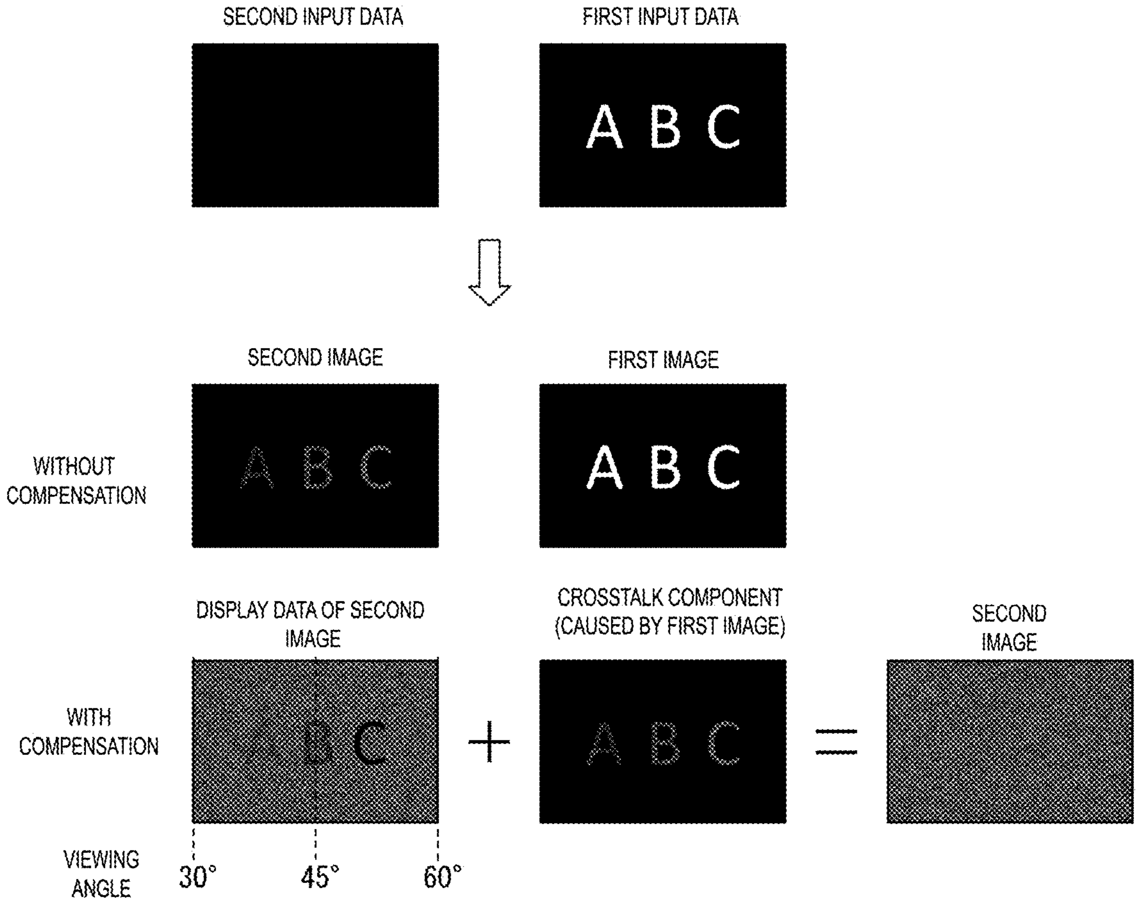
FIG. 21 illustrates a comparison of a generation mechanism of the second image.
Figure 22:
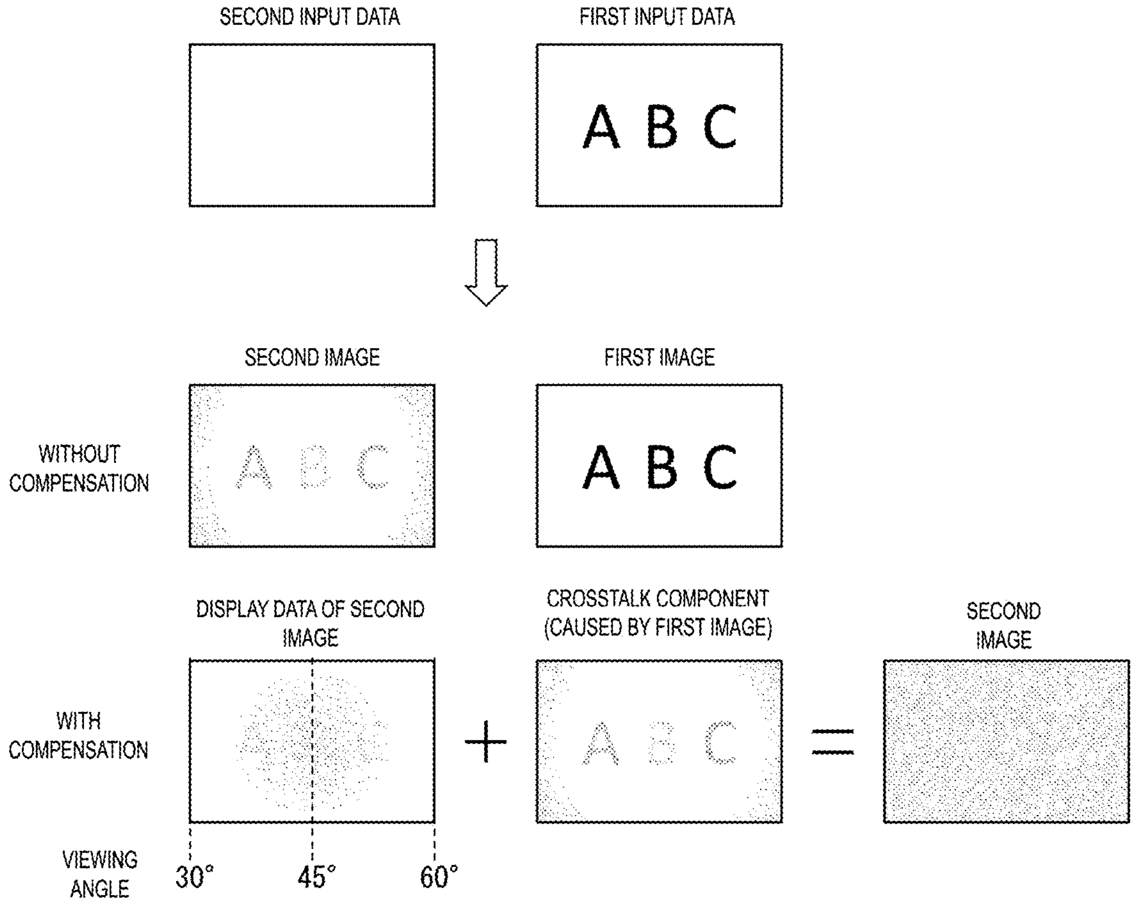
FIG. 22 illustrates a comparison of a generation mechanism of the second image.

The display device 1 can be applied to a privacy mode in vehicle-mounted dual-view display. In the vehicle-mounted dual-view display, a mode is required in which an image viewed by a person in the front passenger seat cannot be viewed from the driver's seat and can be viewed only from the front passenger seat. When the disclosure is applied to the privacy mode, the driver's seat side is displayed as illustrated in FIG. 21 when the black display is performed, and the driver's seat side is displayed as illustrated in FIG. 22 when the white display is performed. FIGS. 21 and 22 each illustrate a comparison of a generation mechanism of the second image.

In each of FIGS. 21 and 22, "without compensation" indicates a case in which the panel control unit 21 of the control unit 2 does not operate in the manner shown in FIGS. 15 to 20 and the description thereof. In each of FIGS. 21 and 22, "with compensation" indicates a case in which the panel control unit 21 of the control unit 2 operates in the manner shown in FIGS. 15 to 20 and the description thereof.

Second Embodiment

Figure 23:
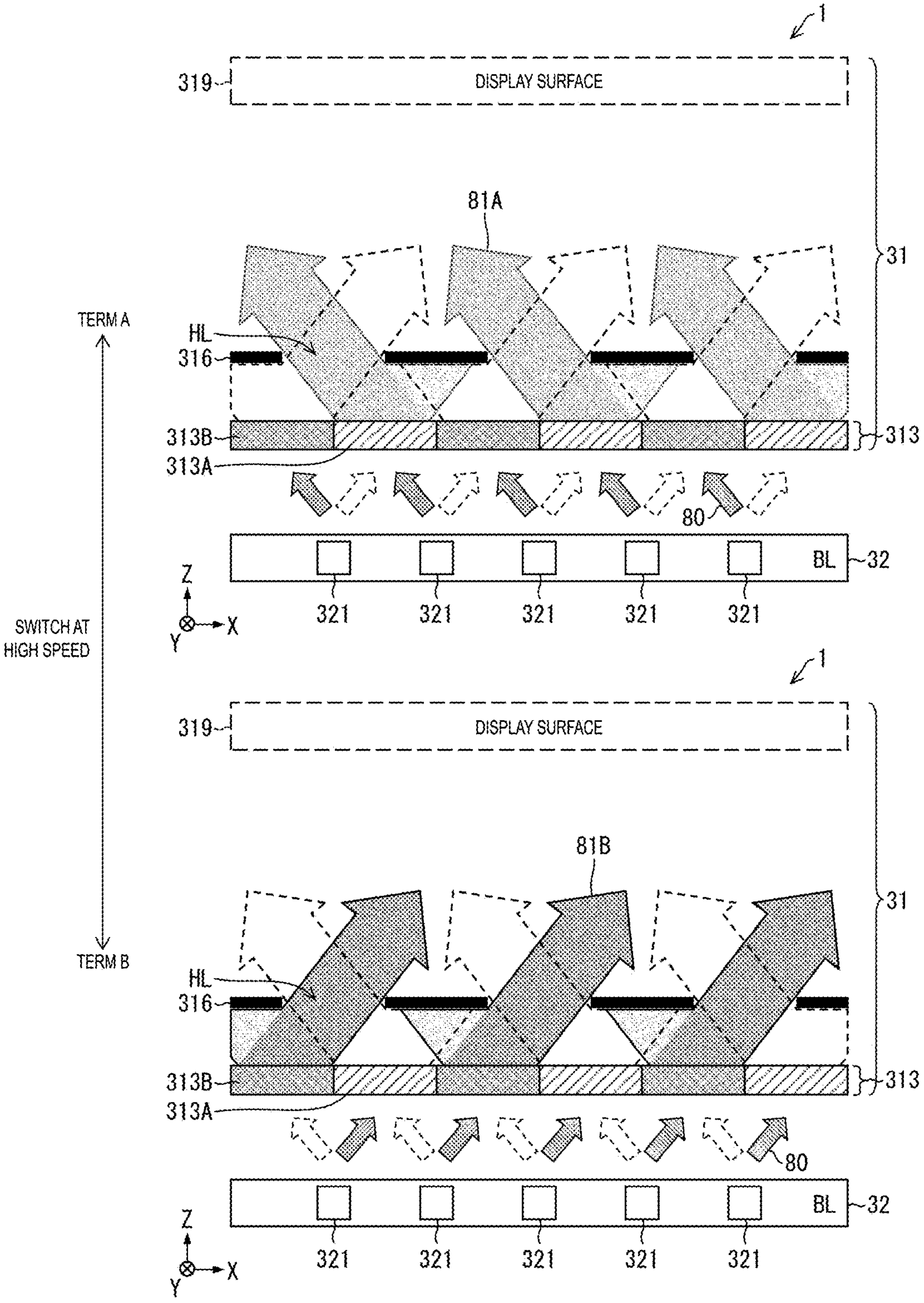
FIG. 23 is a view for explaining various pieces of light involved in the dual-view in an operation example of a display device according to a second embodiment of the disclosure.

FIG. 23 is a view for explaining various pieces of light involved in the dual-view in an operation example of a display device 1 according to a second embodiment of the disclosure. The technique of the disclosure is also applicable to a dual-view of a time division system as illustrated in FIG. 23.

As a term A, the first image is displayed on the first pixel group 313A. In the term A, among the plurality of light sources 321, only light sources necessary for displaying the first image are turned on. As a term B, the second image is displayed on the second pixel group 313B. In the term B, among the plurality of light sources 321, only light sources necessary for displaying the second image are turned on. In the display device 1 according to the second embodiment of the disclosure, the term A and the term B are switched at high speed, and the term A and the term B are continuously repeated.

In the display device 1 according to the second embodiment of the disclosure, display is performed every other column of the plurality of pixels PX. However, when the resolution is sufficiently high, a problem of a serious deterioration in display quality in the display device 1 does not occur. In the term A, the second image is the black display and the corresponding light source 321 is not turned on, so that light leakage toward the second side is significantly reduced.

In the dual-view of the time division system, the crosstalk is reduced, but may be adversely affected caused by the responsiveness of the liquid crystal. Further, when there is a temperature gradient in the display surface 319, the response time of the liquid crystal may differ depending on the location in the display surface 319, and the luminance actually reached at the time of the white display may differ. In the dual-view of the time division system, it is necessary to reduce the crosstalk caused by the responsiveness of the liquid crystal.

In the display device 1 according to the second embodiment of the disclosure, by performing control similar to that of the display device 1 according to the first embodiment of the disclosure, reduction of the crosstalk caused by the responsiveness of the liquid crystal can be coped with.

The disclosure is not limited to the embodiments described above, and various modifications may be made within the scope of the claims. Embodiments obtained by appropriately combining technical approaches disclosed in the different embodiments also fall within the technical scope of the disclosure. Furthermore, novel technical features can be formed by combining the technical approaches disclosed in the embodiments.

The invention claimed is:

1. A display device comprising:

a display unit configured to superimpose and display a first image visually recognized in a first viewing range and a second image visually recognized in a second viewing range; and a control unit configured to control the display unit, wherein in a first display pattern in which first input data corresponding to the first image is a first highest gray scale and second input data corresponding to the second image is a second lowest gray scale, the control unit sets the second lowest gray scale as display data of the second image, in a second display pattern in which the first input data is a first lowest gray scale and the second input data is the second lowest gray scale, the control unit sets a gray scale larger than the second lowest gray scale as the display data of the second image, the display unit includes:

a pixel group including a plurality of pixels configured to display the first image and the second image and including a liquid crystal, a light source configured to irradiate the pixel group with light from a back face of the pixel group, and a plurality of separation members configured to separate the first image and the second image from each other, and a direction in which a light emission intensity of the light source is largest is a direction passing through a gap between two of adjacent ones of the plurality of separation members.

2. The display device according to claim 1, wherein in the first display pattern, luminance depending on a plurality of viewing angles of the second viewing range is constant.

3. The display device according to claim 1, wherein in the second display pattern, luminance depending on a plurality of viewing angles of the second viewing range is constant.

4. The display device according to claim 1, wherein when the first input data is the first highest gray scale and the second input data is a second highest gray scale, the control unit sets a gray scale smaller than the second highest gray scale as the display data of the second image, and when the first input data is the first lowest gray scale and the second input data is the second highest gray scale, the control unit sets the second highest gray scale as the display data of the second image.

5. The display device according to claim 1, wherein when the second input data is the second highest gray scale and the first input data is the first lowest gray scale, the control unit sets the first lowest gray scale as display data of the first image, and in the second display pattern, the control unit sets a gray scale larger than the first lowest gray scale as the display data of the first image.

6. The display device according to claim 5, wherein when the second input data is the second highest gray scale and the first input data is the first highest gray scale, the control unit sets a gray scale smaller than the first highest gray scale as the display data of the first image, and when the second input data is the second lowest gray scale and the first input data is the first highest gray scale, the control unit sets the first highest gray scale as the display data of the first image.

7. The display device according to claim 1, wherein the control unit makes characteristics of luminance with respect to a gray scale in the first input data different from characteristic of luminance with respect to a gray scale in the second input data.

* * * * *